United States Patent
Stemmer et al.

(10) Patent No.: US 9,994,132 B2
(45) Date of Patent: Jun. 12, 2018

(54) ADJUSTING DRIVE, IN PARTICULAR HEIGHT-ADJUSTING DRIVE, FOR A VEHICLE SEAT AND HAVING A CATCH DEVICE

(71) Applicant: Johnson Controls GMBH, Burscheid (DE)

(72) Inventors: Jürgen Stemmer, Remscheid (DE); Dmitrij Gerdt, Köln (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 143 days.

(21) Appl. No.: 14/904,256

(22) PCT Filed: Jun. 25, 2014

(86) PCT No.: PCT/EP2014/063383
§ 371 (c)(1),
(2) Date: Jan. 11, 2016

(87) PCT Pub. No.: WO2015/003905
PCT Pub. Date: Jan. 15, 2015

(65) Prior Publication Data
US 2016/0144742 A1    May 26, 2016

(30) Foreign Application Priority Data

Jul. 11, 2013 (DE) .................. 10 2013 011 515
Oct. 2, 2013 (DE) .................. 10 2013 016 289

(51) Int. Cl.
*B60N 2/16*    (2006.01)
*B60N 2/44*    (2006.01)
(Continued)

(52) U.S. Cl.
CPC .......... *B60N 2/4435* (2013.01); *B60N 2/167* (2013.01); *B60N 2/168* (2013.01); *F16D 41/088* (2013.01);
(Continued)

(58) Field of Classification Search
CPC .... B60N 2/167; B60N 2/168; B60N 2205/20; B60N 2/4435; B60N 2/444; F16D 41/064; F16D 41/066; F16D 41/088; F16D 41/105
(Continued)

(56) References Cited

U.S. PATENT DOCUMENTS 5,896,973 A    4/1999    Hochmuth et al.
6,149,235 A    11/2000    Fahim
(Continued)

FOREIGN PATENT DOCUMENTS

DE    19847081 B4    6/2004
JP    H10-511445 A    11/1998
JP    2002045254 A    2/2002

OTHER PUBLICATIONS

International Search Report for International Application No. PCT/EP2014/063383; dated Nov. 9, 2014.
(Continued)

*Primary Examiner* — Richard M Lorence
(74) *Attorney, Agent, or Firm* — The Dobrusin Law Firm, P.C.

(57) ABSTRACT

The present invention relates to an adjusting drive (1), in particular a height-adjusting drive, for a vehicle seat and having a drive part (2) that is connected to a lever and having an output part (11) that is connected to an adjuster, for example the height adjuster, for the vehicle seat, an actuator (3) being arranged between the drive part and the output part. The actuator is rotatably driven by the drive part (2) and, in turn, rotatably drives the output part (11).

12 Claims, 3 Drawing Sheets

(51) Int. Cl.
  *F16D 41/08* (2006.01)
  *F16D 41/10* (2006.01)
(52) U.S. Cl.
  CPC ........ *F16D 41/105* (2013.01); *B60N 2205/20* (2013.01)
(58) Field of Classification Search
  USPC .................................................. 192/223.2
  See application file for complete search history.

(56) References Cited

U.S. PATENT DOCUMENTS

| | | | |
|---|---|---|---|
| 6,273,233 B1* | 8/2001 | Denis | B60N 2/2257 |
| | | | 192/223.2 |
| 6,481,557 B2 | 11/2002 | Denis | |
| 6,508,347 B1 | 1/2003 | Hochmuth | |
| 7,182,196 B2 | 2/2007 | Weber | |
| 9,056,564 B2 | 6/2015 | Schulz et al. | |
| 2003/0173182 A1 | 9/2003 | Kim | |
| 2007/0137978 A1* | 6/2007 | Yamada | B60N 2/1615 |
| | | | 192/223.2 |
| 2009/0273218 A1* | 11/2009 | Park | B60N 2/167 |
| | | | 297/284.6 |

OTHER PUBLICATIONS

English Translation of the International Preliminary Report on Patentability for Application No. PCT/EP2014/063383, dated Jan. 21, 2016.
Japanese Office Action for application No. 2016-524727, dated Jan. 23, 2017.

* cited by examiner

ADJUSTING DRIVE, IN PARTICULAR HEIGHT-ADJUSTING DRIVE, FOR A VEHICLE SEAT AND HAVING A CATCH DEVICE

The present invention relates to an adjusting drive, in particular height-adjusting drive, for a vehicle seat, having an input part, which is connected to a handle, and having an output part, which is connected to an adjuster, e.g. the height adjuster of the vehicle seat, wherein an actuator is arranged between the input part and the output part, said actuator being driven in rotation by the input part and, for its part, driving the output part in rotation.

Adjusting drives of this kind, e.g. height-adjusting drives, are sufficiently well known from the prior art and are used to drive the adjustment, in particular height adjustment, of a vehicle seat or seat surface of a vehicle seat, by means of which the vehicle seat is adapted to the ergonomics of the respective seat occupant. However, the adjusting drives, in particular height-adjusting drives, according to the prior art have the disadvantage that they have too much idle travel.

It was therefore the object of the present invention to make available an adjusting drive, in particular height-adjusting drive, which does not have the disadvantages of the prior art.

The object is achieved by means of an adjusting drive, in particular a height-adjusting drive, for a vehicle seat, having an input part, which is connected to a handle, and having an output part, which interacts with the adjuster, in particular the height adjuster, wherein an actuator is arranged between the input part and the output part, said actuator being driven in rotation by the input part and, for its part, driving the output part in rotation, wherein a means which at least reduces the relative movement between the actuator and the output part, at least temporarily, is provided between the actuator and the output part.

The present invention relates to the driving of an adjustment, in particular height adjustment, in the interior of a motor vehicle, e.g. the adjustment, in particular height adjustment, of a vehicle seat, by means of which the height of the seat surface of the vehicle seat can be adapted, in particular to adapt the vehicle seat to the contour of the respective seat occupant. However, it is also possible to use the adjusting drive, in particular height-adjusting drive, according to the invention to change the slope of the vehicle seat and/or of the seat surface and/or the longitudinal position of the vehicle seat. However, the adjusting drive, in particular height-adjusting drive, according to the invention is also suitable for any other adjustment in the interior of a motor vehicle. The adjusting drive, in particular height-adjusting drive, according to the invention has an input part, which is connected to a handle, e.g. a pump lever or a hand wheel, and is driven in rotation thereby. This torque is transmitted to a rotating output part, which is connected positively and/or nonpositively to the adjuster, e.g. the height adjuster. A rotating actuator is provided between the input part and the output part, said actuator being driven by the input part and transmitting its torque to the output part. According to the invention, a means which at least reduces, in particular prevents, the relative movement between the actuator and the output part, in particular temporarily, is now provided between the actuator and the output part. This avoids a situation where a distance between the actuator and the output part, which is established particularly when the input part is no longer being supplied with a torque, reaches an unwanted size. If the input part is then supplied once again with a torque, only a relatively small gap or no gap must be crossed before the adjusting drive drives the adjuster again. As a result, the adjustment response, e.g. the height adjustment response, to a corresponding movement of the handle is quicker, which enhances the comfort of the seat occupant, for example.

A relative movement between the actuator and the output part in two opposite directions of rotation is preferably at least reduced, in particular temporarily.

The means for reducing the relative movement between the actuator and the output part is preferably a spring means, which is connected to the output part, in particular for conjoint rotation or integrally.

The means for reducing the relative movement between the actuator and the output part preferably has one or more positive engagement and/or nonpositive engagement means, e.g. in the form of one or more recesses and/or protrusions, each of which preferably interacts with a complementary recess and/or protrusion on and/or in the actuator, in particular by a latching action, wherein the latching action preferably takes place by a relative movement between the output part and the actuator.

The positive engagement and/or nonpositive engagement means can be situated both on the radially inner and/or outer circumference and in an axial direction—relative to the axis of rotation of the output part—on the means for reducing the relative movement between the actuator and the output part.

The means is preferably a sheet-metal part, which is preferably bent and/or stamped and, in particular, is manufactured from a spring steel.

This means preferably has a multiplicity of positive engagement and/or nonpositive engagement means, which interact positively and/or nonpositively with corresponding positive engagement and/or nonpositive engagement means on the actuator.

As an alternative or in addition, the means for reducing the relative movement between the actuator and the input part can also be a frictional engagement means, which acts between the actuator and the output part.

The invention is explained below by means of FIGS. 1-8. These explanations are purely illustrative and do not restrict the general concept of the invention.

Figure 3A:
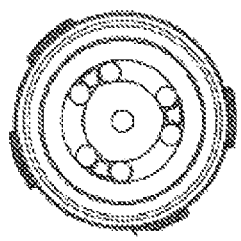
Figure 3B:
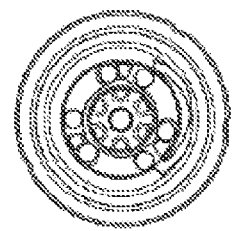
Figure 3C:
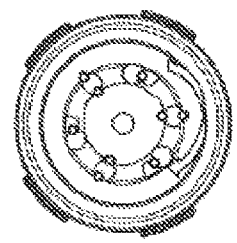

FIGS. 3A, 3B, and 3C show the input side of an adjusting drive, in particular height-adjusting drive.

Figure 4:
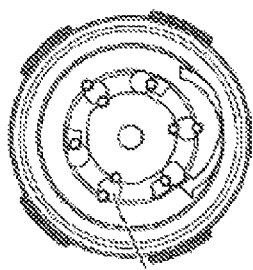

FIG. 4 shows the input side of an adjusting drive, in particular height-adjusting drive.

Figure 5A:
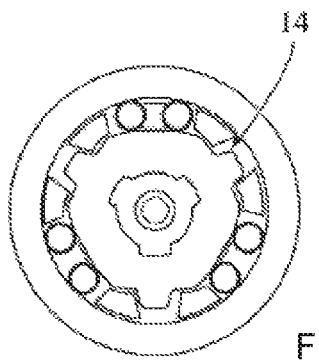

FIG. 5A shows an adjusting drive, in particular height-adjusting drive, according to the prior art.

Figure 5B:
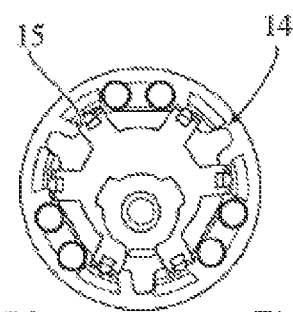

FIG. 5B shows an adjusting drive, in particular height-adjusting drive, according to the invention.

Figure 6A:
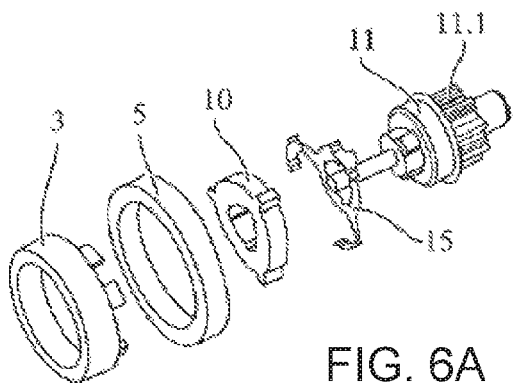
Figure 6B:
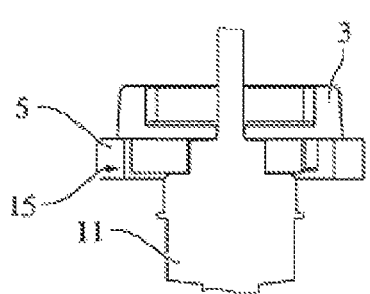

FIGS. 6A and 6B show an exploded drawing of an adjusting drive, in particular height-adjusting drive, according to the invention.

Figure 7A:
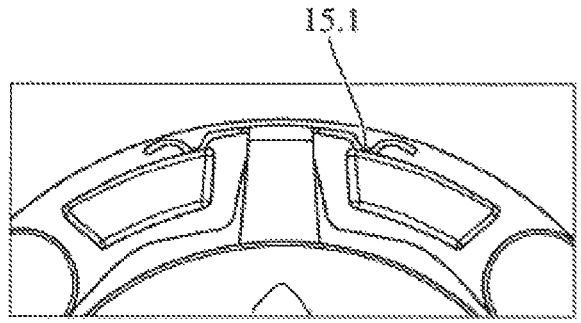
Figure 7B:
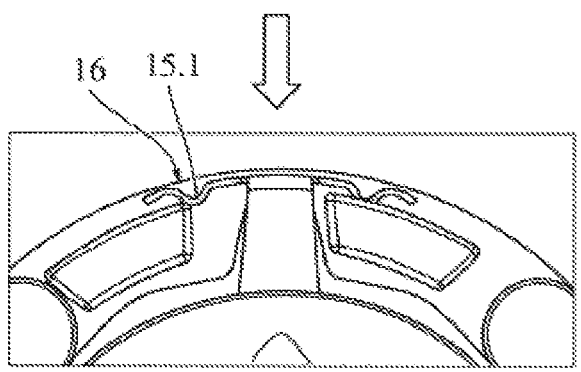

FIGS. 7A and 7B show an embodiment of the means for reducing the relative movement between the actuator and the output part.

Figure 8A:
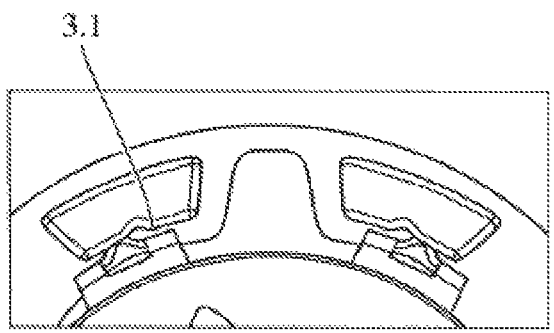
Figure 8B:
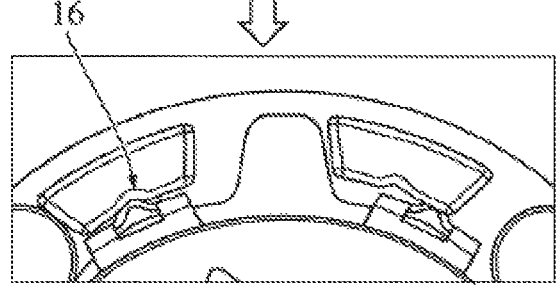

FIGS. 8A and 8B show an embodiment of the means for reducing the relative movement between the actuator and the output part.

Figure 1:
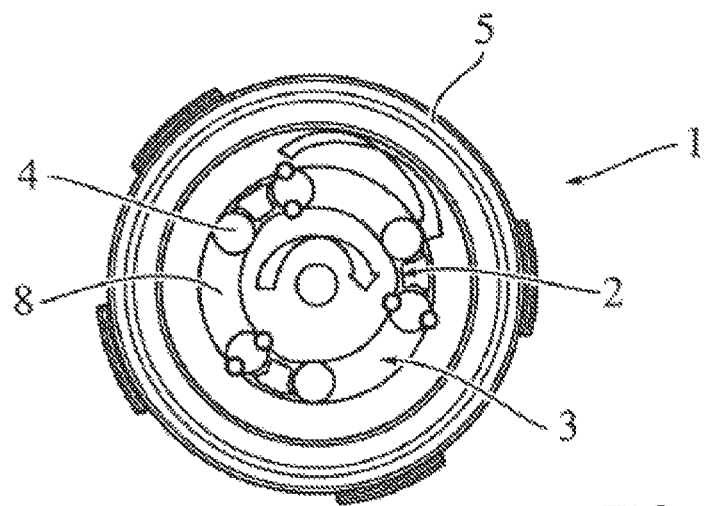
FIG. 1 shows the input side of an adjusting drive, in particular height-adjusting drive.

FIG. 1 shows the input side of the adjusting drive, in particular height-adjusting drive, 1. This has an input part 2, which is connected directly or indirectly to a handle, e.g. a pump lever, and is driven in rotation thereby, as symbolized by the arrow. As likewise indicated by the arrow, this rotary motion is transmitted in the present case by means of rolling elements 4, which are each mounted between a part of the housing 5 and an intermediate element 8, in particular a spring intermediate element, to an actuator 3. A person skilled in the art will understand that the actuator can also be driven by any other means familiar to a person skilled in the art.

Figure 2A:
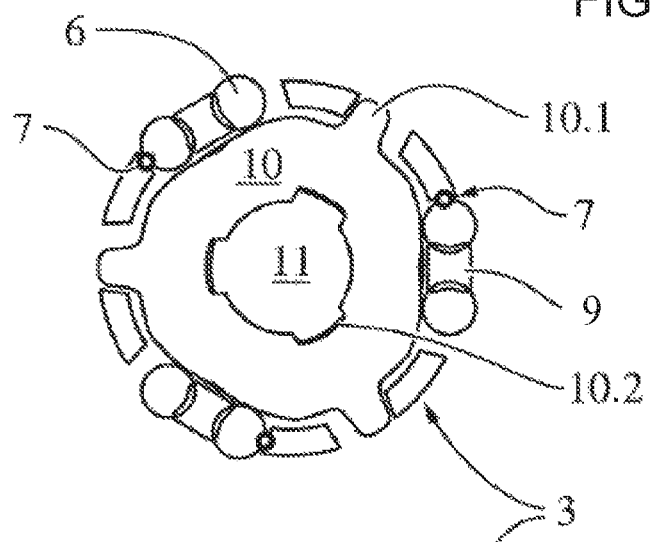
FIGS. 2A and 2B show the output side of an adjusting drive, in particular height-adjusting drive.
Figure 2B:
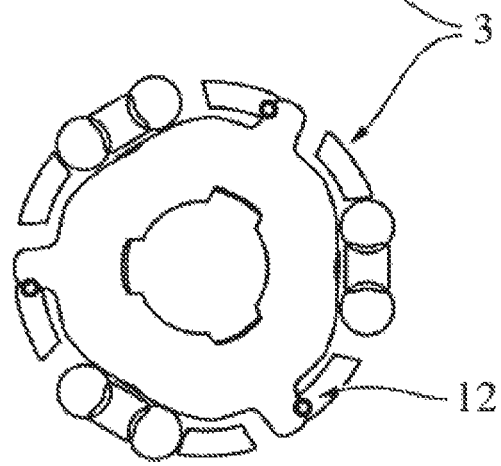

FIGS. 2A and 2B show the output side of the adjusting drive, in particular height-adjusting drive. As can be seen especially from FIG. 2A, the rotation of the actuator 3, here in the clockwise direction, initially gives rise to a contact 7 between the actuator and the rolling elements 6, in this case balls, which are likewise provided on the output side and can thereby be moved, in particular, from a locking position into an unlocking position. An intermediate element 9, in particular a spring intermediate element, is preferably provided between each two rolling elements 6. For torque transmission on the output side, the actuator has corresponding projections. When the actuator 3 is rotated further, there is a contact 12 between the actuator and, in this case, a torque transmission means 10, which is connected to the output part 11 for conjoint rotation. A person skilled in the art will understand that the torque transmission means 10 can also be provided integrally with the output part 11. For contact and torque transmission between the actuator 3 and the torque transmission means 10, the latter has, in this case on its outer circumference, positive engagement and/or nonpositive engagement means 10.1, which are brought into contact with the actuator, in particular with the projections thereof, at the points 12, whereby the torque is transmitted. Positive engagement and/or nonpositive engagement means 10.2 are furthermore provided on the inner circumference of the torque transmission means 10, these engagement means interacting with complementary positive engagement and/or nonpositive engagement means on the output part 11 and thereby transmitting a torque from the means 10 to the output part 11.

FIGS. 3A, 3B, and 3C show the input side of the adjusting drive, in particular height-adjusting drive. FIG. 3a shows a neutral position, in which no torque is transmitted from the input part to the actuator. As soon as the input part 2 is rotated clockwise, the rolling elements 4 are clamped between the housing 5 and the intermediate elements 8, and a torque can be transmitted from the input part 2 to the actuator 3, this being illustrated in FIG. 3b. FIG. 3c shows a position in which the actuator has been rotated clockwise by 30°.

As soon as the lever and hence the input part is transferred back into the neutral position (cf FIG. 4), the actuator will also turn by a certain amount, in this case counterclockwise, e.g. owing to the friction 13 between the input part 2, the rolling elements 4 and the actuator 3, thereby giving rise to an idle travel, which is not constant but can vary between a very large and a relatively small amount.

This idle travel is illustrated in FIG. 5A by the relatively large gap 14 between the actuator and the positive engagement and/or nonpositive engagement means 10.1 on the circumference of the torque transmission means 10.

In order to prevent such a large gap and the associated idle travel, the present invention proposes a means for reducing the relative movement between the actuator 3 and the output part 11 or torque transmission means 10. In the present case, this means 15 is a bent and/or stamped sheet-metal part, which is provided, in particular, from spring steel and is connected to the output part 11 for conjoint rotation. As can be seen, in particular, from FIGS. 7A-B and 8A-B, the means 15 has positive engagement and/or nonpositive engagement means 15.1, which engage, preferably by a latching action, in complementary positive engagement and/or nonpositive engagement means on the actuator or rest thereon as soon as the actuator moves relative to the output part. The relative movement between the actuator and the output part is at least reduced thereby, as a result of which the gap 14 (cf FIG. 5b) is relatively small in comparison with the gap using an adjusting drive, in particular height-adjusting drive, according to the prior art. This positive and/or nonpositive engagement is preferably at least partially canceled again as soon as the adjusting drive, in particular height-adjusting drive, is actuated again. The means which at least reduces the relative movement between the actuator and the output part, at least temporarily, is preferably effective only when the input part is not being actuated and/or while it is being transferred to its neutral position.

FIGS. 6A and 6B show the adjusting drive, in particular height-adjusting drive, according to the invention in an exploded drawing and an assembly drawing. It can be seen that the means 15 is connected to the output part for conjoint rotation and, in the present case, has three arms, on each of which positive engagement and/or nonpositive engagement means 15.1 are provided, in this case two such means, which interact positively and/or nonpositively with complementary positive engagement and/or nonpositive engagement means on the actuator.

An embodiment of these positive engagement and/or nonpositive engagement means 15.1 is shown in FIGS. 7A and 7B. In the present case, this is a radially inward protrusion, which is not in latching engagement with the actuator in FIG. 7A. However, as soon as the actuator moves relative to the means 15 and hence to the output part, the positive engagement and/or nonpositive engagement means 15.1 enters into latching engagement with a projection on the actuator, resulting in the catch position 16, which at least reduces, in particular prevents, further relative movement between the output part and the actuator, this being shown in FIG. 7B.

FIGS. 8A and 8B show an alternative embodiment of the positive engagement and/or nonpositive engagement means 15.1. These positive engagement and/or nonpositive engagement means are, in turn, protrusions which are provided radially on the circumference of the means 15 but, in the present case, point outward away from the axis of rotation of the adjusting drive, in particular height-adjusting drive, and not inward in the direction of the axis of rotation, as in FIGS. 7A and 7B. In the present case, the actuator furthermore has a complementary positive engagement and/or nonpositive engagement means 3.1, which enters into latching engagement with the positive engagement and/or nonpositive engagement means 15.1 as soon as the actuator moves relative to the output part.

Both from FIGS. 7A-B and from FIG. 8A-B, it can be seen that the reduction in the relative movement acts in both directions of rotation, i.e. clockwise and counterclockwise.

LIST OF REFERENCE SIGNS

1 adjusting drive, height-adjusting drive
2 input part
3 actuator
3.1 positive engagement and/or nonpositive engagement means
4 input-side rolling element, ball
5 housing
6 output-side rolling element 7 contact between the actuator and the output-side rolling element
8 intermediate element, input side
9 intermediate element, output side
10 torque transmission means
10.1 positive engagement and/or nonpositive engagement means on the outer circumference
10.2 positive engagement and/or nonpositive engagement means on the inner circumference
11 output part
11.1 positive engagement and/or nonpositive engagement means
12 contact between the actuator and the torque transmission means
13 frictional engagement means
14 gap
15 means which at least temporarily reduces the relative movement between the actuator and the output part, catch device
15.1 positive engagement and/or nonpositive engagement means
16 catch position

We claim:

1. An adjusting drive for a vehicle seat, having an input part, which is connected to a handle, and having an output part, which interacts with an adjuster;
   wherein an actuator is arranged between the input part and the output part, the actuator being driven in rotation by the input part and, for its part, driving the output part in rotation;
   wherein an element which at least reduces a relative movement between the actuator and the output part, at least temporarily, is provided between the actuator and the output part; and
   wherein the element has three arms projecting radially outwards, on each of which two positive engagement members are provided, which interact positively and/or non-positively with complementary positive engagement and/or non-positive engagement locations on the actuator.

2. The adjusting drive as claimed in claim 1, wherein the element at least reduces the relative movement between the actuator and the output part in two opposite directions of rotation at least temporarily.

3. The adjusting drive as claimed in claim 1, wherein the element is a biasing device, which is in communication with the output part for conjoint rotation and/or integrally.

4. The adjusting drive as claimed in claim 1, wherein the element has one or more positive engagement and/or nonpositive engagement members in the form of one or more recesses and/or protrusions.

5. The adjusting drive as claimed in claim 4, wherein each recess and/or protrusion interacts with a complementary recess and/or protrusion on and/or in the actuator.

6. The adjusting drive as claimed in claim 5, wherein interaction between each recess and/or protrusion and a complementary recess and/or protrusion on and/or in the actuator is by a latching action, and wherein the latching action takes place by a relative movement between the output part and the actuator.

7. The adjusting drive as claimed in claim 4, wherein the positive engagement and/or nonpositive engagement members are situated on a radially inner and/or outer circumference or in an axial direction on the element, in each case relative to an axis of rotation of the output part.

8. The adjusting drive as claimed in claim 1, wherein the element is a sheet-metal part.

9. The adjusting device as claimed in claim 8, wherein the sheet-metal part is bent and/or stamped and is manufactured from a spring steel.

10. The adjusting drive as claimed in claim 1, wherein the element has a multiplicity of positive engagement and/or nonpositive engagement members, which interact positively and/or nonpositively with corresponding positive engagement and/or nonpositive engagement locations on the actuator.

11. The adjusting drive as claimed in claim 1, wherein the element is frictionally engaged between the actuator and the output part.

12. The adjusting drive as claimed in claim 1, wherein the adjusting drive is a height-adjusting drive.

* * * * *